United States Patent
Kubo et al.

(10) Patent No.: US 12,311,962 B2
(45) Date of Patent: May 27, 2025

(54) ABNORMALITY DETECTION DEVICE AND ABNORMALITY DETECTION PROGRAM

(71) Applicant: HONDA MOTOR CO., LTD., Tokyo (JP)

(72) Inventors: Yuito Kubo, Tokyo (JP); Kyosuke Takekoshi, Tokyo (JP); Eiji Oshima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 190 days.

(21) Appl. No.: 18/005,897

(22) PCT Filed: Jun. 18, 2021

(86) PCT No.: PCT/JP2021/023245
§ 371 (c)(1),
(2) Date: Jan. 18, 2023

(87) PCT Pub. No.: WO2022/019020
PCT Pub. Date: Jan. 27, 2022

(65) Prior Publication Data
US 2023/0322240 A1    Oct. 12, 2023

(30) Foreign Application Priority Data
Jul. 20, 2020 (JP) ................... 2020-124062

(51) Int. Cl.
*B60W 50/02* (2012.01)
*G06N 20/10* (2019.01)
*B60W 50/00* (2006.01)

(52) U.S. Cl.
CPC ......... *B60W 50/0205* (2013.01); *G06N 20/10* (2019.01); *B60W 2050/005* (2013.01); *B60W 2050/021* (2013.01); *B60W 2556/10* (2020.02)

(58) Field of Classification Search
CPC ....... B60W 50/0205; B60W 2050/005; B60W 2050/021; B60W 2556/10; G06N 20/10;
(Continued)

(56) References Cited

FOREIGN PATENT DOCUMENTS

CN      108028790    *  5/2018
CN      109101986 A    12/2018
(Continued)

OTHER PUBLICATIONS

International Search Report by ISA/JP mailed on Sep. 7, 2021, on PCT/JP2021/023245, 2 pages.
(Continued)

*Primary Examiner* — Muhammad Shafi
(74) *Attorney, Agent, or Firm* — Rankin, Hill & Clark LLP

(57) ABSTRACT

An abnormality detection device includes: a time window process part configured to divide, by time windows, each of a plurality of vehicle signals each including a time-series data and to extract the data included in the time window; a learning part configured to create learned information via learning using the time-series data in the vehicle signal divided by the time windows; and an abnormality degree calculation part configured to reconstruct the time-series data in the vehicle signal divided by the time windows, based on the learned information, thereby calculate an error between before and after the reconstruction, and further calculate an abnormality degree of the vehicle signal based on the calculated error and the learned information.

6 Claims, 6 Drawing Sheets

(58) Field of Classification Search
CPC ... G06N 3/0455; G06N 3/084; G01M 17/007;
G05B 23/02
USPC .......................................................... 701/33
See application file for complete search history.

(56) References Cited

FOREIGN PATENT DOCUMENTS

| | | | |
|---|---|---|---|
| CN | 110034968 | * | 7/2019 |
| JP | 2014-234113 A | | 12/2014 |
| JP | 2014234113 | * | 12/2014 |
| JP | 2015-170121 A | | 9/2015 |
| JP | 2016-045861 A | | 4/2016 |
| JP | 2019-101728 A | | 6/2019 |
| JP | 2019-175462 A | | 10/2019 |

OTHER PUBLICATIONS

Written Opinion by ISA/JP mailed on Sep. 7, 2021, on PCT/JP2021/023245, 3 pages.
Chinese Office Action received in corresponding Chinese application No. 202180049128.5 dated Mar. 27, 2025 with English translation (10 pages).

* cited by examiner

Normal data

Abnormal data $B_{s,n}$ : Data inputted into autoencoder $\widehat{B}_{s,n}$ : Data outputted from autoencoder (Reconstructed data)

$e_n$ : Reconstruction error

ABNORMALITY DETECTION DEVICE AND ABNORMALITY DETECTION PROGRAM

CROSS REFERENCE TO RELATED APPLICATION

This application is a National Stage Application of PCT/JP2021/023245, filed on Jun. 18, 2021, and which application is incorporated herein by reference. To the extent appropriate, a claim of priority is made to the above disclosed application.

TECHNICAL FIELD

The present invention relates to a technique of detecting an abnormality of a vehicle signal.

BACKGROUND ART

Patent Documents 1 and 2 each disclose that, in a durability test of a vehicle of interest, a reference data showing normality is previously acquired from another vehicle and an abnormality in data measured in the durability test of the vehicle of interest is detected, using the reference data.

RELATED ART DOCUMENTS

Patent Documents

Patent Document 1: Japanese Laid-Open Patent Application, Publication No. 2015-170121
Patent Document 2: Japanese Laid-Open Patent Application, Publication No. 2016-045861

SUMMARY OF THE INVENTION

Problems to be Solved by the Invention

In the techniques disclosed in Patent Documents 1 and 2, the reference data is collected not from the vehicle of interest but from another vehicle which is not a target for the test. There is thus a possibility that, when an interindividual difference of the target vehicle to the reference data is large, a normal data on the target vehicle may be detected as abnormal. Additionally, when a reference data is collected from a non-target vehicle which has not been used very hard, a relatively small variability in measured data on a target vehicle caused by damage or wear during a test may be detected as abnormal.

In light of the described above, the present invention has been made in an attempt to provide an abnormality detection device and an abnormality detection program, each of which can detect an abnormality of a vehicle while keeping down an interindividual difference of the vehicle or influence from damage or wear thereon during a test.

Means for Solving the Problems

In order to solve the problems described above, an abnormality detection device of the present invention includes: a time window process part configured to divide, by time windows, each of a plurality of vehicle signals each including a time-series data and to extract the data included in the time window; a learning part configured to create learned information by means of learning using the time-series data in the vehicle signal divided by the time windows; and an abnormality degree calculation part configured to reconstruct the time-series data in the vehicle signal divided by the time windows, based on the learned information, thereby calculate an error between before and after the reconstruction, and further calculate an abnormality degree based on the calculated error and the learned information.

An abnormality detection program of the present invention causes a computer to serve as the abnormality detection device.

Advantageous Effects of the Invention

In detecting an abnormality of a vehicle, the present invention can keep down an interindividual difference of the vehicle or influence from damage or wear thereon during a test.

EMBODIMENTS FOR CARRYING OUT THE INVENTION

Figure 1:
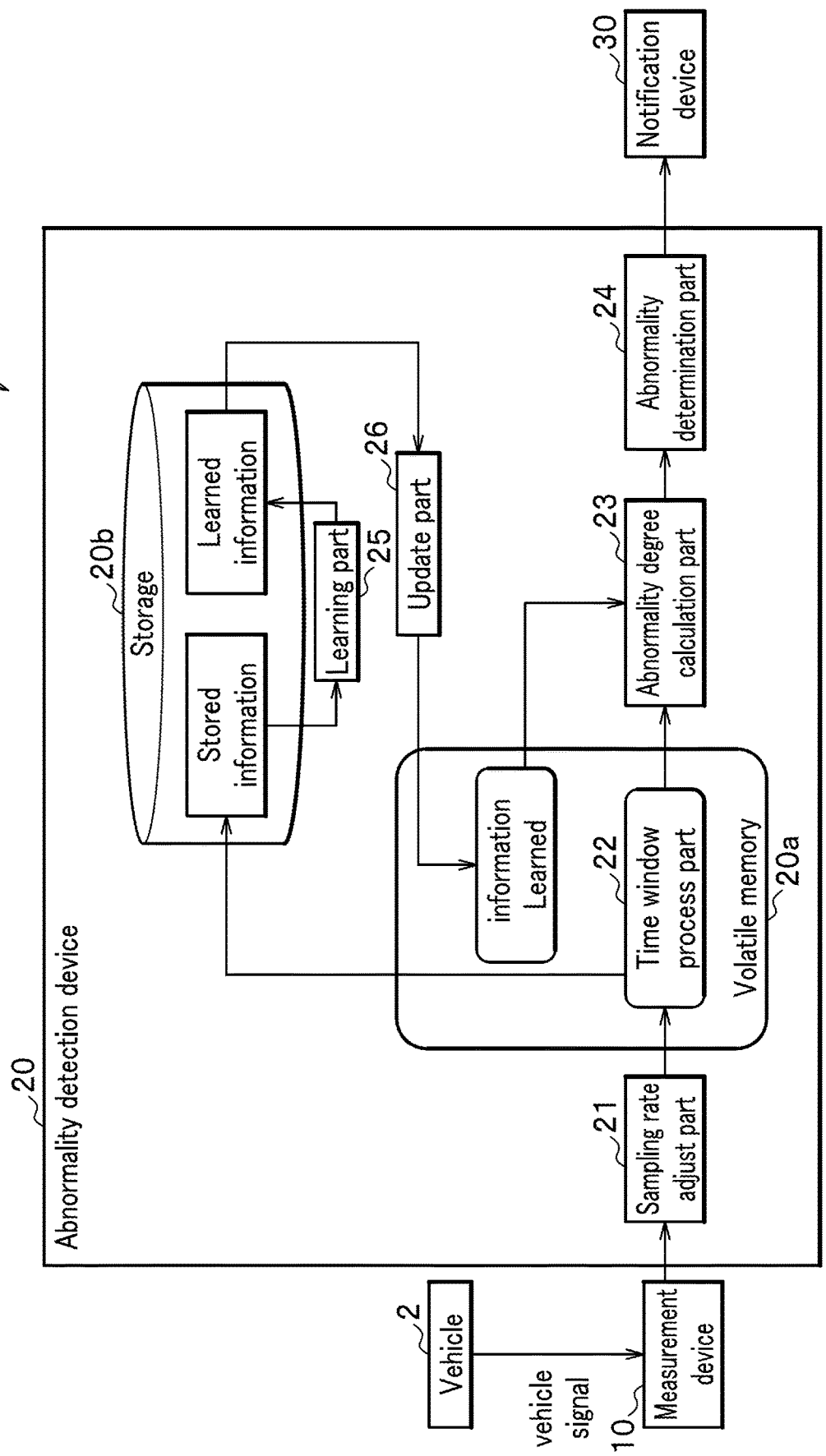
FIG. 1 is a block diagram schematically illustrating an abnormality detection system according to an embodiment of the present invention.

Embodiments of the present invention are described below in detail with reference to related drawings where appropriate. When a component in an embodiment is the same as another component in another embodiment, the same reference numerals are given thereto and duplicate description thereof is omitted.

As illustrated in FIG. 1, an abnormality detection system 1 according to an embodiment of the present invention is a system for detecting an abnormality of a vehicle 2. The abnormality detection system 1 includes a measurement device 10, an abnormality detection device 20, and a notification device 30.

<Measurement Device>

The measurement device 10: measures a signal of various types of a vehicle 2 on a simulated run in a bench durability test (a vehicle signal); and transmits a plurality of the measured vehicle signals to the abnormality detection device 20. The measured vehicle signals include signals having different orders and/or units. Some examples thereof are a rotation rate of a wheel (a wheel speed), a rotation rate of an engine, a rotation torque of the engine, a throttle opening of the engine, a temperature of various types of the engine (such as an exhaust gas temperature, a water temperature, and an oil temperature), an output torque of a drive motor, a generation current of the drive motor, and a trouble code from an engine control unit.

<Abnormality Detection Device>

The abnormality detection device 20: acquires a plurality of the vehicle signals measured by the measurement device 10; and detects whether or not there is an abnormality for each of the acquired vehicle signals. The abnormality detection device 20 includes, for example, a CPU (Central Processing Unit), a ROM (Read-Only Memory), a RAM (Random Access Memory), and an input/output circuit. The abnormality detection device 20 includes, as function parts thereof: a sampling rate adjust part 21, a time window process part 22, an abnormality degree calculation part 23, an abnormality determination part 24, and a learning part 25.

<<Sampling Rate Adjust Part>>

Figure 2:
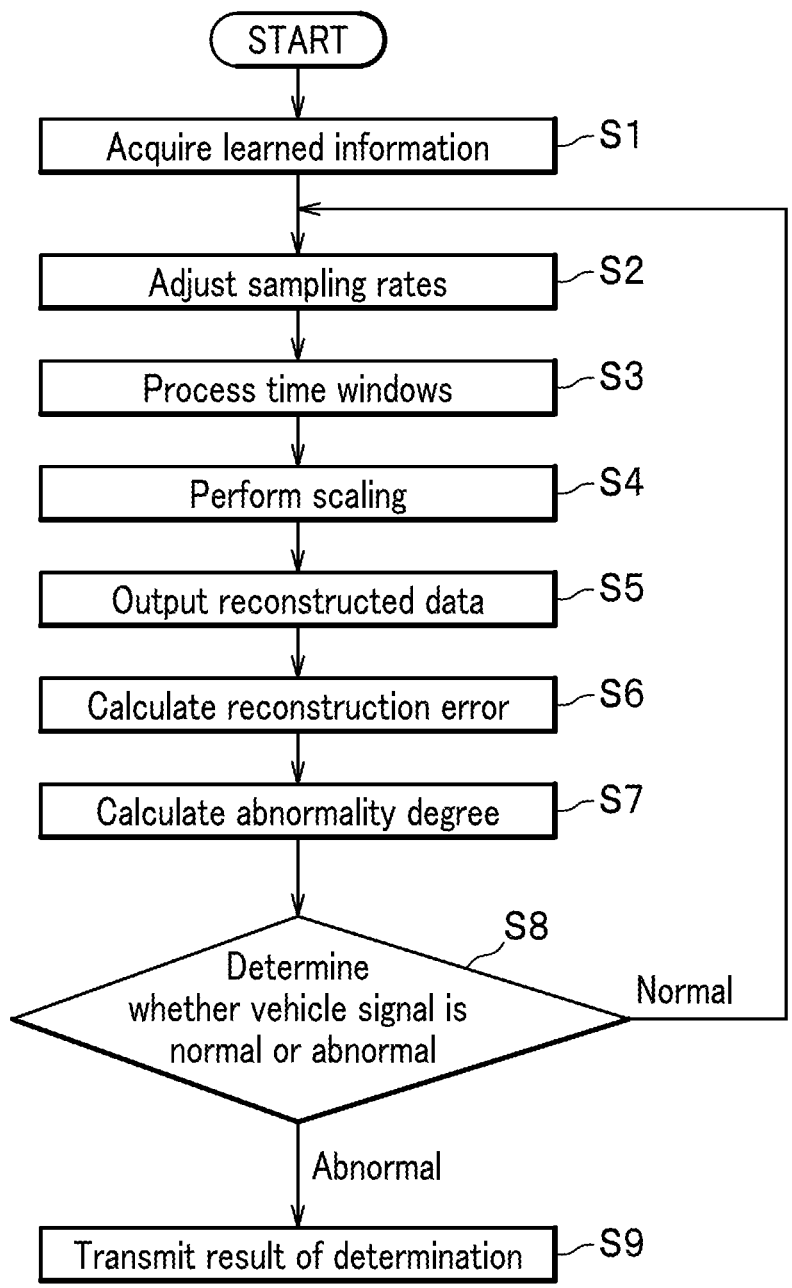
FIG. 2 is a flowchart for explaining an example how the abnormality detection device works according to the embodiment of the present invention.
Figure 4:
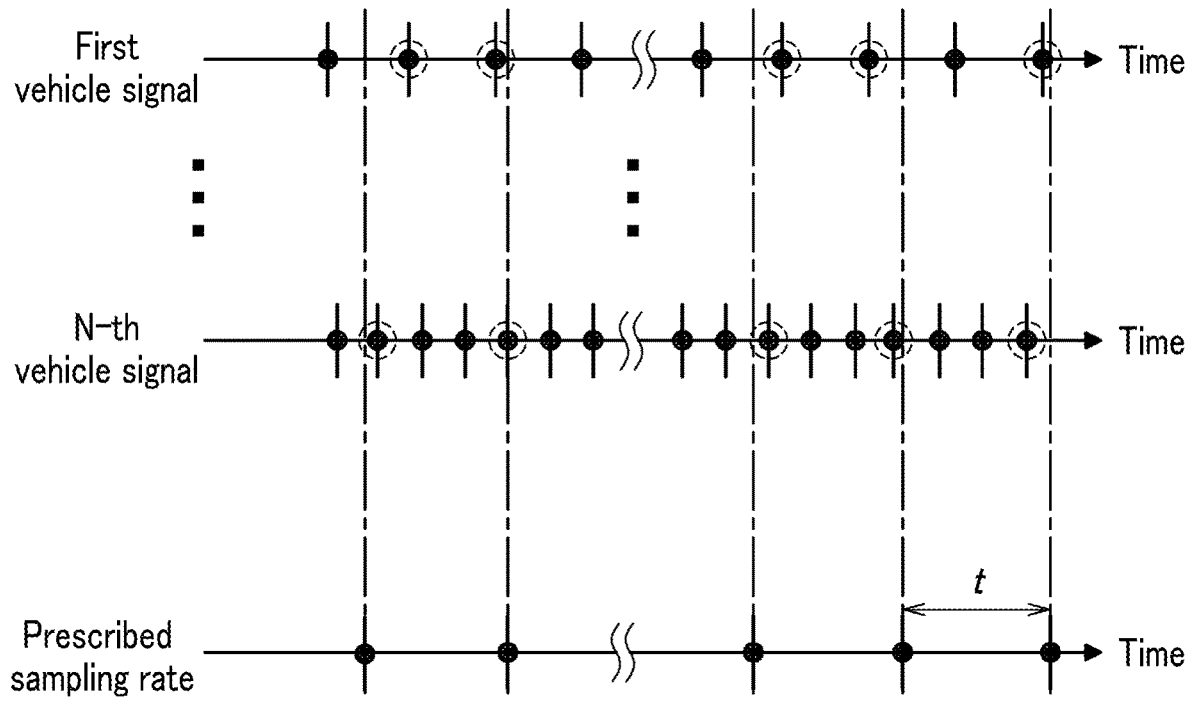
FIG. 4 is a schematic diagram for explaining an example of how sampling rates of a vehicle signal is equalized.

The sampling rate adjust part 21: acquires a plurality of vehicle signals (with n types) measured by the measurement device 10; and adjusts and equalizes sampling rates of a plurality of the acquired vehicle signals (step S2 in FIG. 2). As illustrated in FIG. 4, a plurality of the acquired vehicle signals include respective time-series data with sampling rates different from each other. In FIG. 4, a signal included in the vehicle signal is represented by a filled circle plotted on an axis indicating a time. The sampling rate adjust part 21: extracts a data which is closest to a timing of a prescribed sampling rate (at intervals of a time "t") from among plural pieces of data in the vehicle signal (a data surrounded by a dotted circle in FIG. 4), as a data of interest at the timing, based on a previously-stored prescribed sampling rate; and decimates a data other than the extracted data of interest. The sampling rate adjust part 21 outputs the vehicle signal with the sampling rate thereof adjusted, to the time window process part 22. The prescribed sampling rate used herein is preferably equal to or larger than the largest sampling rate of those of a plurality of the vehicle signals.

The sampling rate adjust part 21 performs the above-described processing, to thereby improve correlationship among the vehicle signals. The sampling rate adjust part 21 can also prevent overtraining of a vehicle signal having a large sampling rate.

<<Time Window Process Part>>

The time window process part 22 is implemented on a volatile memory 20a. The time window process part 22: acquires the vehicle signals of n types with respective sampling rates thereof having been adjusted by the sampling rate adjust part 21; and extracts a prescribed number of pieces (m pieces) of data $B_n$, included in a time window, from the acquired vehicle signals with respective sampling rates thereof having been adjusted (step S3 in FIG. 2). The term "t" used herein is a slide width of a time window and is also a cycle of determining an abnormality (a time period required for performing steps S2 to S9). The data $B_n$ (or $B_n^{(0)}$) is data included in a current time window (m by 1 matrix).

Figure 5:
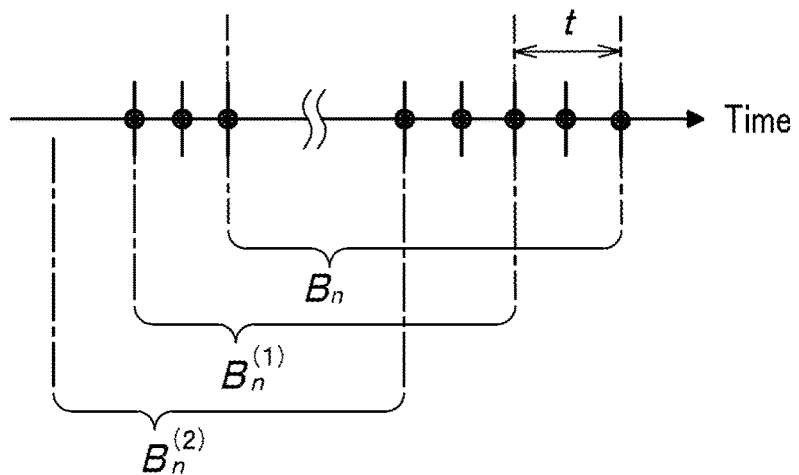
FIG. 5 is a schematic diagram for explaining an example of how the vehicle signal with the sampling rates thereof adjusted is divided by time windows.
Figure 6:
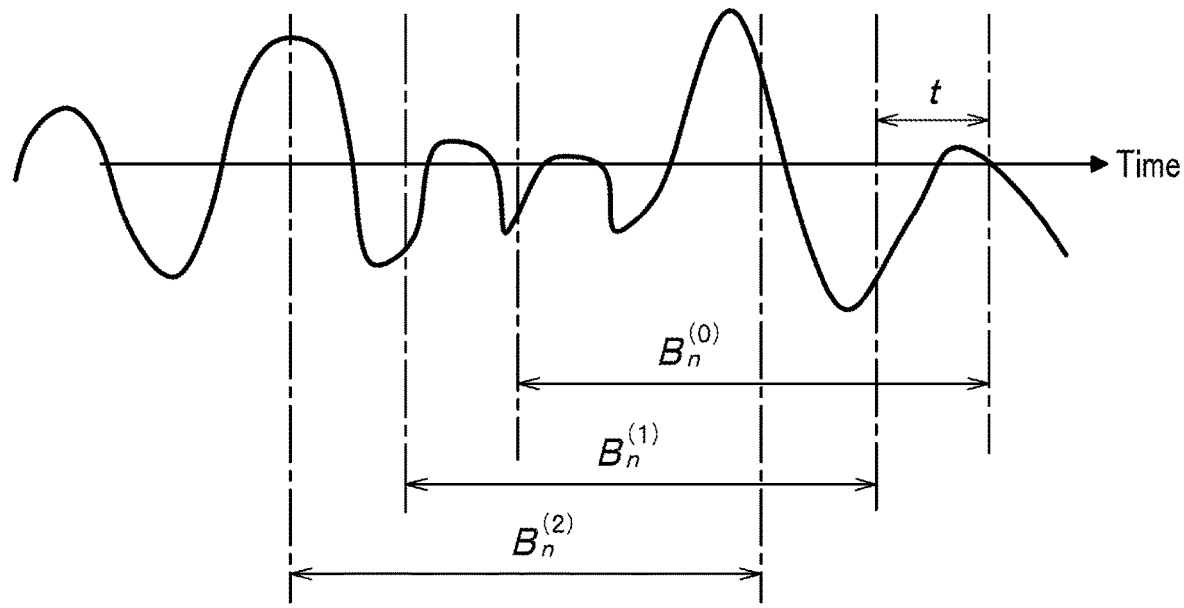
FIG. 6 is a schematic diagram for explaining a correlation between: a waveform of the vehicle signal with the sampling rates thereof adjusted; and a time window.

As illustrated in each of FIG. 5 and FIG. 6, the time window process part 22: slides a time window having a prescribed time period, using a time t as a slide width; and extracts m pieces of data included in the time window of interest, to thereby create $B_n$. The slide width t of the time window may be smaller than the prescribed time period of the time window. Further, the slide width t of the time window is preferably same as the time interval t of the prescribed sampling rate.

The time window process part 22: outputs the created $B_n$ to the abnormality degree calculation part 23; and stores $C_n$ which is a matrix in which $B_n$ is arrayed, as stored information, in a storage 20b. When the current time window data is defined as $B_n^{(0)}$, the stored information $C_n$ is expressed by the following formula.

$$C_n = (B_n^{(0)}, B_n^{(1)}, B_n^{(2)}, \ldots, B_n^{(p)})$$ [Formula 1]

In the formula, "$B_n^{(p)}$" is the data "$B_n$" included in a time window "p" times earlier (m by 1 matrix). "$C_n$" is the stored information stored in the storage 20b (m by p matrix). "p" is the number of times the data $B_n$ is extracted (in this embodiment, a value equal to the number of times the abnormality determination part 24 determines an abnormality); and is increased with a lapse of time from when the abnormality detection device 20 is started.

Figure 7:
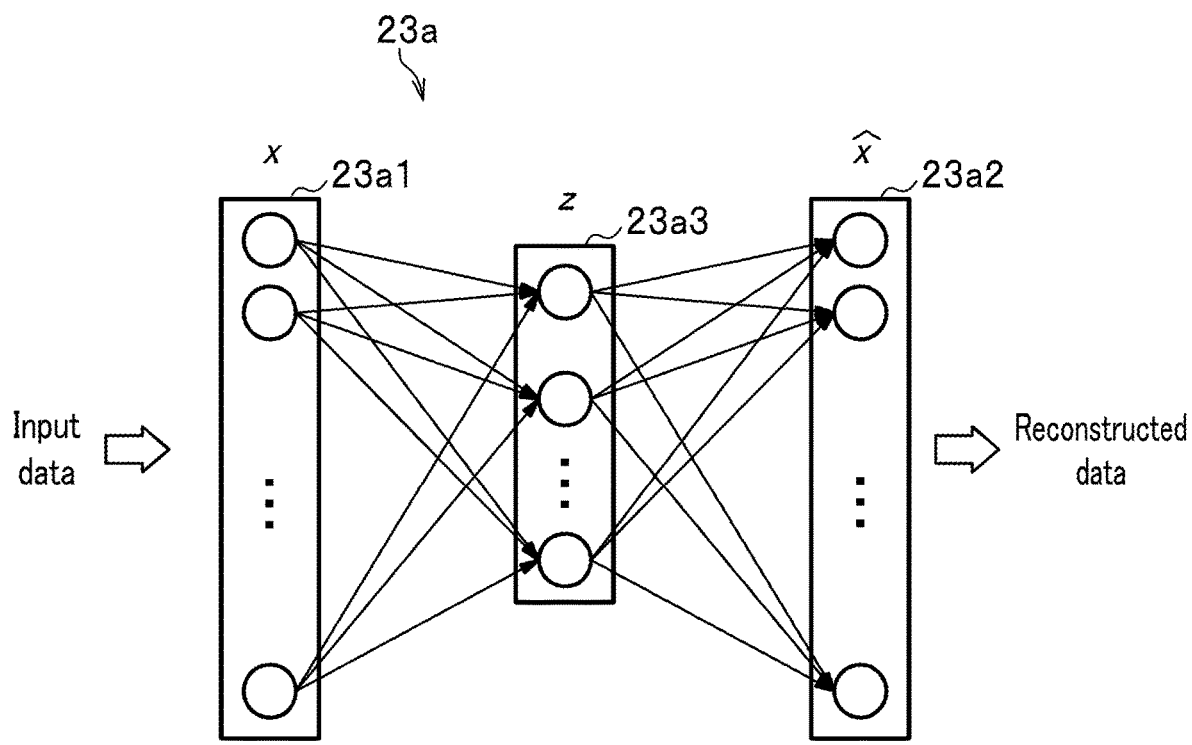
FIG. 7 is a schematic diagram for explaining an example of an autoencoder.

The time window process part 22 divides a vehicle signal by the number of inputs "m" of an autoencoder 23a, which is to be described hereinafter (see FIG. 7), thus allowing learning in real time and calculation of an abnormality degree.

<<Abnormality Degree Calculation Part>>

As illustrated in FIG. 1, the abnormality degree calculation part 23: acquires learned information on a vehicle signal stored in the volatile memory 20a (step S1 in FIG. 2); also acquires $B_n$ created by the time window process part 22; and calculates an abnormality degree of the vehicle signal based on the acquired $B_n$ and learned information. The learned information will be described in detail hereinafter.

In this embodiment, the abnormality degree calculation part 23 calculates an abnormality degree of information on a vehicle of interest, based on: the current $B_n^{(0)}$ created by the time window process part 22; and learned information which is learned using learning data $L_n$ by the learning part 25 using the previous $C_n$, that is, $B_n^{(1)}, B_n^{(2)}, \ldots,$ and $B_n^{(p)}$. The learning data $L_n$ used herein: is a "m by (k+1)" matrix which is created by combining $B_n^{(0)}$ with data in columns 1 to k extracted from $C_n$ as storage data; and is expressed by the following formula.

$$L_n = (B_n^{(0)}, B_n^{(1)}, B_n^{(2)}, \ldots, B_n^{(k)})$$ [Formula 2]

In the formula, data in column 0 (in the first column) corresponds to the current $B_n^{(0)}$ and data in column k (in the k+1 column) is data $B_n^{(k)}$ k times earlier. When k is sufficiently large, accuracy in a learned model is improved, while a learning time in step S12 becomes longer. Thus, "k" is determined on a heuristic basis, such that a learning time for updating learned information at an appropriate timing is secured and a desired accuracy of monitoring can be obtained.

The abnormality degree calculation part 23 scales (standardizes) the time window data $B_n$, based on the learned information, to thereby calculate the scaled data $B_{s,n}$ (step S4 in FIG. 2). The scaled data $B_{s,n}$ is obtained by calculating all matrix elements of $B_s$ using the following formula.

$$[B_{s,n}]_i = ([B_n]_i - \min_n)/(\max_n - \min_n)_{1 \le i \le m}$$ [Formula 3]

In the formula, "$\min_n$" is a minimum value of data in a n-th signal in the learned information and "$\max_n$" is a maximum value of data in the n-th signal in the learned information. "$B_{s,n}$" is data obtained by scaling $B_n$ (m by 1 matrix). "$[B_n]_i$" is an i-th scalar quantity of $B_n$. "$[B_{s,n}]_i$" is an i-th scalar quantity of $B_{s,n}$. A vector element of the scaled data $B_{s,n}$ always falls within a range from a minimum value of 0 to a maximum value of 1.

The abnormality degree calculation part 23 performs the above-described scaling processing, to thereby equally handle plural pieces of information on vehicles having respective different orders and calculate an appropriate abnormality degree.

The abnormality degree calculation part 23 then autoencodes and reconstructs the scaled data $B_s$, using the autoencoder 23a (see FIG. 7) (step S5 in FIG. 2). The autoencoder 23a includes: an input layer 23a1 into which an input data is inputted; an output layer 23a2 from which a reconstructed data is outputted; and an intermediate layer (a hidden layer) 23a3 which is provided between the input layer 23a1 and the output layer 23a2. In the intermediate layer 23a3, a latent variable z and a reconstructed data x^ ("^" immediately above "x") are calculated by the following formulas, respectively.

$$z = \sigma(W_x^{(1)} \cdot x + b_x^{(1)})$$

$$\hat{x} = \sigma(W_x^{(2)} \cdot x + b_x^{(2)})$$

In the formulas, "x" is a matrix inputted into the autoencoder 23a. Each of "$W_x^{(1)}$", "$b_x^{(1)}$", "$W_x^{(2)}$", and "$b_x^{(2)}$" is information on autoencoder corresponding to the input x. "z" is a latent variable. "x^" ("^" immediately above "x") is a matrix outputted from the autoencoder 23a (a reconstructed data).

The abnormality degree calculation part 23 then calculates an error (a reconstruction error) "e" included in the reconstructed data (step S6 in FIG. 2). The reconstruction error e is calculated using the following formulas.

$$\Delta x = x - \hat{x}$$

$$e = \|\Delta x\|_2 = \sqrt{\langle \Delta x, \Delta x \rangle} \qquad \text{[Formula 5]}$$

In the formulas, "$\Delta x$" is a difference and the reconstruction error e is a Euclidean norm of $\Delta x$.

Figure 8A:
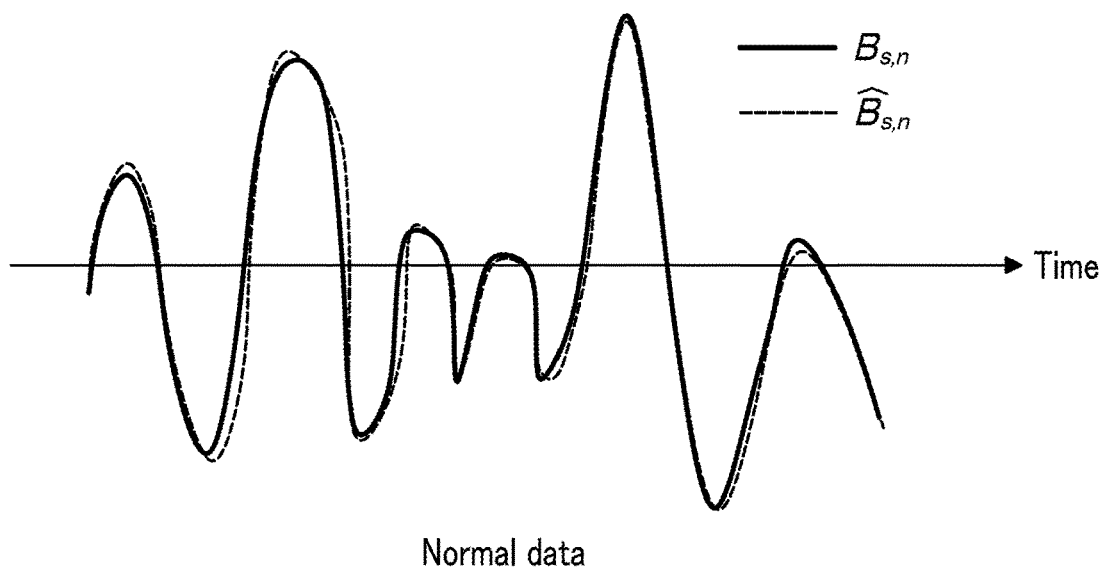
FIG. 8A is a schematic diagram for explaining an input data and an output data into and from an autoencoder, as well as a reconstruction error, when a vehicle signal is normal.
Figure 8B:
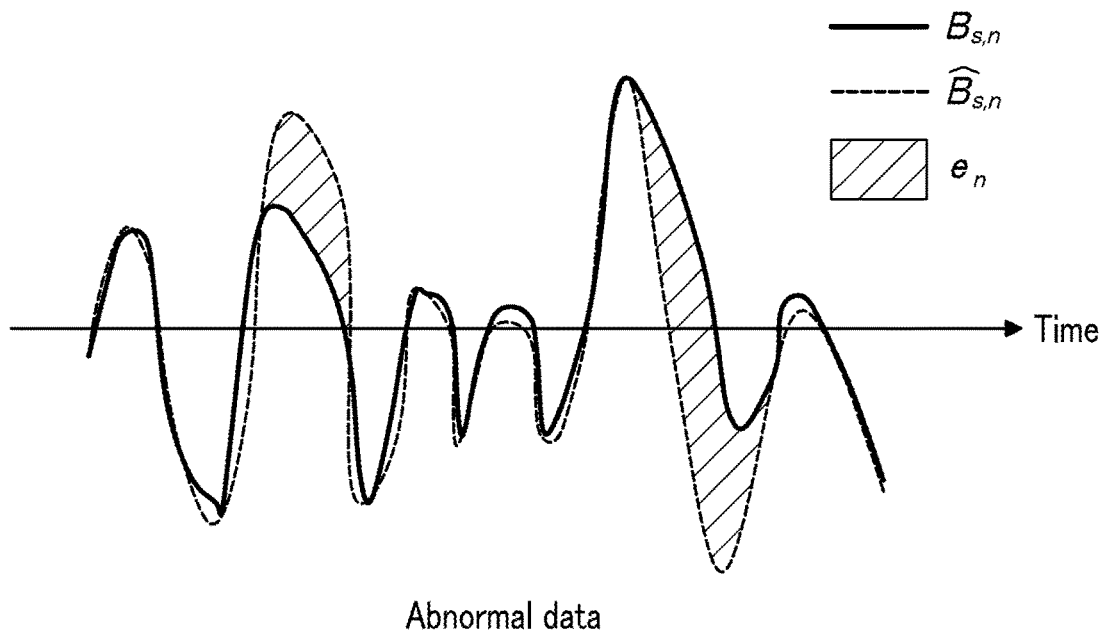
FIG. 8B is a schematic diagram for explaining an input data and an output data into and from the autoencoder, as well as a reconstruction error, when a vehicle signal is abnormal.

The abnormality degree calculation part 23 inputs $B_{s,n}$ into the autoencoder 23a (x=$B_{s,n}$); and thereby calculates a reconstruction error $e_n$ of the n-th vehicle signal. As illustrated in FIG. 8A and FIG. 8B, when information on vehicle inputted into the autoencoder 23a is normal (FIG. 8A), the reconstruction error $e_n$ becomes small. When the information on vehicle inputted into the autoencoder 23a is abnormal (FIG. 8B), the reconstruction error $e_n$ becomes large.

When there is a strong correlation among a plurality of vehicle signals, the abnormality degree calculation part 23 can perform a processing to a plurality of the vehicle signals all together to calculate respective reconstruction errors. Let "a" and "b" be respective serial numbers of two vehicle signals having a correlation with each other. Input data x and reconstructed data x^ ("^" immediately above "B") are expressed by the following formulas, respectively.

$$x = \begin{pmatrix} B_{s,a} \\ B_{s,b} \end{pmatrix} \qquad \text{[Formula 6]}$$

$$\hat{x} = \begin{pmatrix} \hat{B}_{s,a} \\ \hat{B}_{s,b} \end{pmatrix}$$

The abnormality degree calculation part 23: calculates a reconstruction error ea from $B_{s,a}$ and $\hat{B}_{s,a}$ ("^" immediately above "B"); and also calculates a reconstruction error eb from $B_{s,b}$ and $\hat{B}_{s,b}$ ("^" immediately above "B"). In this case, information on autoencoder corresponds to $W_{ab}^{(1)}$, $b_{ab}^{(1)}$, $W_{ab}^{(2)}$, and $b_{ab}^{(2)}$.

The autoencoder 23a is not limited to that using a sigmoid function σ as an activation function and may be that using, for example, a hyperbolic tangent function. The number of layers of an intermediate layer in the autoencoder 23a is not limited to one and may be plural. A technique of calculating a reconstruction error is not limited to that using a Euclidean norm (a L2 norm) and may be that using, for example, a L1 norm.

A technique of reconstruction is not limited to that using the autoencoder 23a and may be that using, for example, principal component analysis. The abnormality degree calculation part 23 cannot perform a processing using a neural network such as classification learning because much of information on vehicle as a target for determination is comprised of normal data. The abnormality degree calculation part 23 therefore: extracts a latent variable using the autoencoder 23a which has learned normal data only; and reconstructs a data of interest, based on the extracted latent variable. Thus, even when an abnormal data deviating from a waveform data is present, the abnormality degree calculation part 23 creates a normal waveform data which has been learned from the reconstruction. The abnormality degree calculation part 23 thereby calculates a reconstruction error e as information deviating from the normal waveform data.

The abnormality degree calculation part 23: calculates a score (an abnormality degree) $S_n$ of a n-th piece of the vehicle information based on a decision function $f_n(x)$ as the learned information and on the reconstruction error $e_n$ (step S7 in FIG. 2); and outputs a result of the calculation to the abnormality determination part 24. The abnormality degree $S_n$ is calculated by the following formula.

$$S_n = f_n(e_n) \qquad \text{[Formula 7]}$$

The abnormality degree calculation part 23 uses a 1-class SVM (Support Vector Machine) as the decision function $f_n(x)$. Thus, when a normal value is inputted in the decision function $f_n(x)$, the score $S_n$ has a value equal to or larger than zero. When an abnormal value is inputted in the decision function $f_n(x)$, the score $S_n$ has a negative value.

<<Abnormality Determination Part>>

The abnormality determination part 24: acquires the score (abnormality degree) $S_n$ calculated by the abnormality degree calculation part 23; and determines whether or not a vehicle signal of interest is abnormal, based on the acquired score (step S8 in FIG. 2). When the score $S_n$ has a negative value in a plurality of consecutive time windows, the abnormality determination part 24 determines that the vehicle signal of interest is abnormal. In other cases, the abnormality determination part 24 determines that the vehicle signal is normal. When the abnormality determination part 24 determines that the vehicle signal is abnormal, the abnormality determination part 24 outputs a result of the determination to the notification device 30 (step S9 in FIG. 2).

Even when a pulsive noise is generated in a vehicle signal, the abnormality determination part 24 can prevent the noise from being determined as an abnormality and can thus detect a real abnormality only.

<<Learning Part>>

The learning part 25: performs learning in real-time, based on data stored in the storage 20a, in parallel with respective operations performed by the sampling rate adjust part 21, the time window process part 22, the abnormality degree calculation part 23, and the abnormality determination part 24; and creates learned information. The learning part 25: reads a matrix of a time required for learning from $C_n$ stored in the storage 20b; and determines the read data as learning data $L_n$ (step S11 in FIG. 3).

Figure 3:
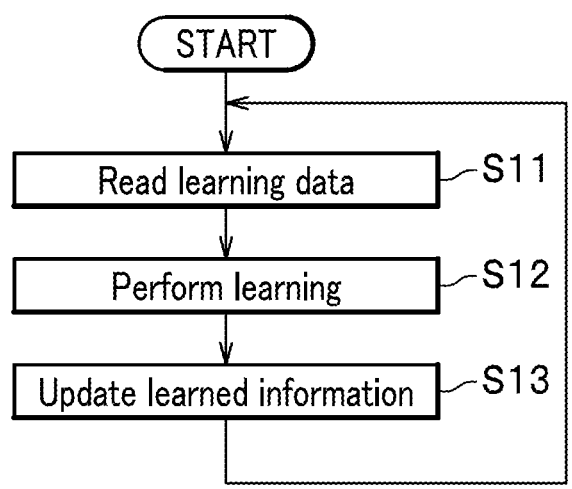
FIG. 3 is a flowchart for explaining another example how the abnormality detection device according to the embodiment of the present invention.

The learning part 25 then extracts each of a maximum value $max_n$ and a minimum value $min_n$ from the learning data $L_n$ (step S12 in FIG. 3). The learning part 25 scales the learning data $L_n$ based on the extracted maximum value $max_n$ and minimum value $min_n$; and thereby calculates the scaled learning data $L_{s,n}$. The learning part 25 makes the autoencoder 23a learn, using the learned data $L_{s,n}$; and thereby creates autoencoder information $W_x^{(1)}$, $b_x^{(1)}$, $W_x^{(2)}$, and $b_x^{(2)}$ (step S12 in FIG. 3). How to make the autoencoder 23a learn by the learning part 25 (algorithm) is, for example, the scaling conjugate gradient descent method. In this case, a preselected value is used as a hyperparameter. The learning part 25 then: calculates a reconstruction error based on the autoencoder information $W_x^{(1)}$, $b_x^{(1)}$, $W_x^{(2)}$, and $b_x^{(2)}$; and creates a decision function $f_n(x)$ using the calculated reconstruction error as a normal data (step S12 in FIG. 3).

The learning part 25 stores: the maximum value $max_n$ and the minimum value mina; the autoencoder information $W_x^{(1)}$, $b_x^{(1)}$, $W_x^{(2)}$, and $b_x^{(2)}$; and the decision function $f_n(x)$, each as learned information, in the storage 20b.

Note that the learning part 25 performs learning independently from respective processings by the sampling rate adjust part 21, the time window process part 22, abnormality degree calculation part 23, and the abnormality determination part 24. The learning part 25 can be thus embodied separately from the abnormality detection device 20, by using another device (for example, another processor or counting machine (such as a PC)).

When the learned information stored in the storage 20b is updated, an update part 26: reads the updated learned information; and stores the read learned information in the volatile memory 20a (step S13 in FIG. 3).

<Notification Device>

The notification device 30 is composed of a display capable of outputting an image, a speaker capable of outputting voice or sound, or the like. The notification device 30: acquires a result determined by the abnormality determination part 24; and notifies a user of the acquired determination result.

The abnormality detection device 20 according to the embodiment of the present invention includes: the time window process part 22 configured to divide, by time windows, each of a plurality of vehicle signals each including a time-series data and to extract the data included in the time window; the learning part 25 configured to create learned information by means of learning using the time-series data in the vehicle signal divided by the time windows; and the abnormality degree calculation part 23 configured to reconstruct the time-series data in the vehicle signal divided by the time windows, based on the learned information, thereby calculate an error between before and after the reconstruction, and further calculate an abnormality degree based on the calculated error and the learned information.

The abnormality detection device 20 can thus calculate an abnormality degree of vehicle information in a current time window, using learned information included in one or more previous time windows. That is, the abnormality detection device 20 can suitably detect an abnormality of the vehicle information, based on the learned information updated in real time, without a need to prepare learned information in advance of an operation of detecting an abnormality.

In the abnormality detection device 20, the abnormality degree calculation part 23 calculates an abnormality degree, based on: a time-series data in the current time window of the vehicle signal; and the learned information using a time-series data in one or more previous time windows.

The abnormality detection device 20 can thus create the learned data and calculate the abnormality degree in parallel more suitably.

In the abnormality detection device 20, the learned information includes a maximum value and a minimum value in the one or more previous time windows of the vehicle signal. The abnormality degree calculation part 23 is configured to: scale the time-series data in the current time window of the vehicle signal, based on the maximum value and the minimum value; and reconstruct the scaled time-series data of the vehicle signal, by means of the autoencoder 23a included in the learned information.

The abnormality detection device 20 can equally handle plural pieces of information on vehicle having respective different orders and thereby calculate an abnormality degree suitably.

The abnormality detection device 20 includes the sampling rate adjust part 21 configured to adjust and equalize respective sampling rates of a plurality of the vehicle signals. The time window process part 22 is configured to divide, by the time windows, time-series data of each of a plurality of vehicle signals with respective sampling rates thereof adjusted.

As described above, the abnormality detection device 20 equalizes respective sampling rates of a plurality of the vehicle signals. This makes it possible to improve a correlation among the vehicle signals and prevent overtraining of a vehicle signal having a large sampling rate.

The abnormality detection device 20 includes the abnormality determination part 24 configured to, when an abnormality occurs in each of a prescribed number of plural and consecutive time windows of a vehicle signal of interest, determine that the vehicle signal is abnormal, based on the calculated abnormality degree described above.

The abnormality detection device 20: can thus prevent, when a pulsive noise is generated in a vehicle signal, the noise from being determined as an abnormality; and can detect a real abnormality only.

The present invention has been described above. The present invention is not, however, limited to the aforementioned embodiments. Various changes are possible within a scope not departing from the gist of the present invention. For example, the abnormality detection device 20 may include no abnormality determination part 24. In this case, a result calculated by the abnormality degree calculation part 23 is transmitted to the notification device 30, which outputs the result using voice, sound or an image. The present invention can also be realized by an abnormality detection program which causes a computer to function as the abnormality detection device 20.

DESCRIPTION OF REFERENCE NUMERALS 1 abnormality detection system
10 measurement device
20 abnormality detection device
21 sampling rate adjust part
22 time window process part
23 abnormality degree calculation part
24 abnormality determination part
25 learning part

The invention claimed is:

1. An abnormality detection device for a vehicle, comprising:
   a sampling rate adjust part configured to equalize respective sampling rates of time-series data included in each of a plurality of vehicle signals, to a prescribed sampling rate, by decimating one or more of the sampling rates based on the prescribed sampling rate;
   a time window process part configured to divide, by time windows, each of a plurality of vehicle signals each including a time-series data and to extract the data included in the time window;
   a learning part configured to create learned information by means of learning using the time-series data in the vehicle signal divided by the time windows; and
   an abnormality degree calculation part configured to reconstruct the time-series data in the vehicle signal divided by the time windows, based on the learned information, thereby calculate an error between before and after the reconstruction, and further calculate an abnormality degree with respect to the prescribed sampling rate, based on the calculated error and the learned information.

2. The abnormality detection device according to claim 1, wherein the abnormality degree calculation part is configured to calculate an abnormality degree, based on: a time-series data in a current time window of the vehicle signal; and the learned information using a time-series data in one or more previous time windows.

3. The abnormality detection device according to claim 2, wherein the learned information includes a maximum value and a minimum value in the one or more previous time windows of the vehicle signal, and
   wherein the abnormality degree calculation part is configured to: scale the time-series data in the current time window of the vehicle signal, based on the maximum value and the minimum value; and reconstruct the scaled time-series data of the vehicle signal, by means of an autoencoder included in the learned information.

4. The abnormality detection device according to claim 3, further comprising an abnormality determination part configured to, when an abnormality occurs in a prescribed number of plural and consecutive time windows of the vehicle signal, determine that the vehicle signal is abnormal, based on the calculated abnormality degree.

5. The abnormality detection device according to claim 2, further comprising an abnormality determination part configured to, when an abnormality occurs in a prescribed number of plural and consecutive time windows of the vehicle signal, determine that the vehicle signal is abnormal, based on the calculated abnormality degree.

6. The abnormality detection device according to claim 1, further comprising an abnormality determination part configured to, when an abnormality occurs in a prescribed number of plural and consecutive time windows of the vehicle signal, determine that the vehicle signal is abnormal, based on the calculated abnormality degree.

* * * * *